(12) United States Patent
Park et al.

(10) Patent No.: US 8,126,348 B2
(45) Date of Patent: Feb. 28, 2012

(54) PRINTING APPARATUS TO REDUCE POWER CONSUMPTION AND CONTROL METHOD THEREOF

(75) Inventors: Kwang-sung Park, Seoul (KR); Cheol-woo Park, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 1339 days.

(21) Appl. No.: 11/657,084

(22) Filed: Jan. 24, 2007

(65) Prior Publication Data

US 2007/0183807 A1    Aug. 9, 2007

(30) Foreign Application Priority Data

Feb. 6, 2006    (KR) .................................. 2006-11275
Sep. 20, 2006    (KR) .................................. 2006-91330

(51) Int. Cl.
     *G03G 15/00*      (2006.01)
     *G03G 21/00*      (2006.01)
(52) U.S. Cl. .......................................... 399/75; 399/88
(58) Field of Classification Search .................. 399/75, 399/88
See application file for complete search history.

(56) References Cited

U.S. PATENT DOCUMENTS 5,689,715 A * 11/1997 Crump et al. ................. 713/310
(Continued)

FOREIGN PATENT DOCUMENTS

CN      151960      8/2004
(Continued)

OTHER PUBLICATIONS

English Abstract of Japanese Priority Application No. 370919/2002.
(Continued)

*Primary Examiner* — David Gray
*Assistant Examiner* — Geoffrey Evans
(74) *Attorney, Agent, or Firm* — Staas & Halsey LLP

(57) ABSTRACT

A printing apparatus including at least one device unit to perform a printing operation; a main controller to control the device unit; a main power supply to supply power to the main controller; an instruction receiving part to receive a user's printing instruction and to transmit the user's printing instruction to the main controller; and a power controller with a power consumption lower than the main controller, to control the main power supply such that the power is supplied to the main controller when the instruction receiving part receives the printing instruction while the printing apparatus is in a standby state wherein supply of power to the main controller is interrupted.

9 Claims, 5 Drawing Sheets

U.S. PATENT DOCUMENTS

| | | | |
|---|---|---|---|
| 5,708,821 A * | 1/1998 | Takikita | 713/310 |
| 5,752,049 A * | 5/1998 | Lee | 713/323 |
| 5,867,720 A | 2/1999 | Hirano | |
| 5,933,581 A * | 8/1999 | Miyazaki et al. | 358/1.14 |
| 6,134,401 A * | 10/2000 | Yun et al. | 399/70 |
| 6,226,472 B1 | 5/2001 | Yun | 399/81 |
| 6,330,069 B1 * | 12/2001 | Kim | 358/1.14 |
| 6,421,754 B1 * | 7/2002 | Kau et al. | 710/261 |
| 6,765,434 B2 | 7/2004 | Mizuno | 327/544 |
| 6,801,730 B2 * | 10/2004 | Johnson et al. | 399/75 |
| 6,804,482 B2 * | 10/2004 | Kim et al. | 399/88 |
| 6,847,794 B2 * | 1/2005 | Namura | 399/88 |
| 6,895,196 B2 * | 5/2005 | Uchizono et al. | 399/75 |
| 6,908,164 B2 * | 6/2005 | Gilbert et al. | 347/5 |
| 7,002,814 B2 * | 2/2006 | Kim et al. | 363/21.15 |
| 7,040,727 B2 * | 5/2006 | Ryu et al. | 347/5 |
| 7,057,754 B1 * | 6/2006 | Tsuchiya et al. | 358/1.15 |
| 7,062,191 B2 * | 6/2006 | Matsukura | 399/88 |
| 7,130,940 B2 * | 10/2006 | Ikeda | 710/72 |
| 7,173,720 B2 * | 2/2007 | Nishizawa | 358/1.14 |
| 7,184,358 B2 * | 2/2007 | Kobayashi et al. | 365/230.06 |
| 7,272,335 B2 * | 9/2007 | Horiuchi | 399/88 |
| 7,283,262 B2 * | 10/2007 | Takeda et al. | 358/1.14 |
| 7,289,745 B2 * | 10/2007 | Nara et al. | 399/88 |
| 7,352,486 B2 * | 4/2008 | Tsuchiya et al. | 358/1.15 |
| 7,461,277 B2 * | 12/2008 | Kawakami et al. | 713/310 |
| 7,586,637 B2 * | 9/2009 | Eastment et al. | 358/1.16 |
| 7,755,779 B2 * | 7/2010 | Miura et al. | 358/1.13 |
| 7,760,850 B2 * | 7/2010 | Kasuya | 378/15 |
| 7,844,193 B2 * | 11/2010 | Takagi et al. | 399/77 |
| 2002/0171694 A1 | 11/2002 | Takayanagi | 347/5 |
| 2003/0140260 A1 * | 7/2003 | Kizawa et al. | 713/300 |
| 2004/0004732 A1 * | 1/2004 | Takeda et al. | 358/1.13 |
| 2005/0094180 A1 * | 5/2005 | Nishimoto et al. | 358/1.13 |
| 2005/0108584 A1 * | 5/2005 | Kawakami et al. | 713/300 |
| 2005/0138447 A1 * | 6/2005 | Kobayashi et al. | 713/300 |
| 2006/0222397 A1 * | 10/2006 | Lowman et al. | 399/88 |
| 2007/0071479 A1 * | 3/2007 | Semma et al. | 399/88 |
| 2007/0127943 A1 * | 6/2007 | Kowari | 399/88 |
| 2009/0003869 A1 * | 1/2009 | Takahashi | 399/75 |
| 2011/0052243 A1 * | 3/2011 | Suzuki | 399/88 |
| 2011/0060929 A1 * | 3/2011 | Park et al. | 713/323 |
| 2011/0097100 A1 * | 4/2011 | Nagasaki | 399/88 |

FOREIGN PATENT DOCUMENTS

| | | |
|---|---|---|
| EP | 0709764 A2 | 5/1996 |
| EP | 1 517 222 | 3/2005 |
| JP | 8-314581 | 11/1996 |
| JP | 10-11179 | 1/1998 |
| JP | 11-65373 | 3/1999 |
| JP | 2005-262586 | 9/2005 |
| JP | 2005-335255 | 12/2005 |
| KR | 1998-053450 | 9/1998 |
| KR | 1999-0069425 | 9/1999 |
| KR | 2004-9465 | 1/2004 |
| KR | 2006-22163 | 3/2006 |

OTHER PUBLICATIONS

Chinese Office Action issued Nov. 7, 2008.

European Search Report dated Sep. 29, 2011 issued in corresponding European Patent Application No. 07101503.6.

Chinese Office Action dated Dec. 23, 2011 issued in corresponding Chinese Application No. 200710003420.5.

* cited by examiner

PRINTING APPARATUS TO REDUCE POWER CONSUMPTION AND CONTROL METHOD THEREOF

CROSS-REFERENCE TO RELATED APPLICATIONS

This application claims the benefit of Korean Patent Application Nos. 2006-11275, filed on Feb. 6, 2006, and 2006-91330, filed on Sep. 20, 2006 in the Korean Intellectual Property Office, the disclosures of which are incorporated herein by reference.

BACKGROUND OF THE INVENTION

1. Field of the Invention

Aspects of the present invention relate to a printing apparatus and a control method thereof, and more particularly, to a printing apparatus, which is capable of reducing power consumption and improving reliability, and a control method thereof.

2. Description of the Related Art

A printing apparatus, such as a printer, a multifunction copier or the like, performs a printing operation by forming an image on a print medium based on printing data. Typically, the printing apparatus has a device unit to perform a printing operation and a controller to control the device unit. The controller may be implemented by a CPU through executing computer programs required to perform the printing operation. The printing apparatus also has a power supply unit, such as an SMPS (switched mode power supply), to supply the device unit and the controller with the power required for them to operate.

The printing apparatus may enter a mode when power to the device unit is interrupted in order to reduce power consumption while printing operations are not performed (hereinafter referred to as "standby mode"). Even in the standby mode, the CPU and the power supply always operate and consume power in order to monitor conditions of the printing apparatus and to control the supply of power to the device unit so that the printing apparatus can enter the standby mode to save power or exit the standby mode to print.

Demand for a higher quality of printing has led to the use of high performance CPUs. These high performance CPUs consume a large amount of power to operate. There are many cases when the CPU and the power supply consume more than several watts in the standby mode, not to mention the normal mode when the printing apparatus performs printing operations. Accordingly, there is a need to reduce the power consumption of a printing apparatus in the standby mode when printing operations are not performed.

SUMMARY OF THE INVENTION

Accordingly, it is an aspect of the present invention to provide a printing apparatus, which is capable of reducing power consumption, and a control method thereof.

It is another aspect of the present invention to provide a printing apparatus, which is capable of improving reliability while reducing power consumption, and a control method thereof.

The foregoing and/or other aspects of the present invention are also achieved by providing a printing apparatus comprising: at least one device unit to perform a printing operation; a main controller to control the device unit; a main power supply to supply power to the main controller; an instruction receiving part to receive a user's printing instruction and to transmit the user's printing instruction to the main controller; and a power controller with a power consumption lower than the main controller, to control the main power supply such that power is supplied to the main controller when the instruction receiving part receives the printing instruction while the printing apparatus is in a standby state wherein supply of power to the main controller is interrupted.

According to another aspect of the present invention, the instruction receiving part comprises a USB (universal serial bus) controller to receive the user's printing instruction from a host apparatus according to a USB standard through a communication with the host apparatus.

According to another aspect of the present invention, the printing apparatus further comprises a power switch to be switched on or off by a user's manipulation; a switch state output part to output a switch state signal corresponding to a switch-on state or a switch-off state of the power switch, wherein the power controller controls the main power supply such that the power is supplied to the main controller when it is determined, based on the switch state signal from the switch state output part, that the power switch is switched on while the printing apparatus is in the standby state.

According to another aspect of the present invention, the switch state output part comprises a photo coupler to output the switch state signal according to the intensity of light corresponding to the switch-on or switch-off state of the power switch.

According to another aspect of the present invention, the USB controller is reset according to the switch state signal outputted from the switch state output part when the power switch is switched on while the printing apparatus is in the standby state, and the power controller controls the main power supply such that the power is supplied to the main controller when it is determined that the USB controller is reset and the power switch is switched on while the printing apparatus is in the standby state.

According to another aspect of the present invention, the printing apparatus further comprises a differential circuit to differentiate the switch state signal outputted from the switch state output part, and to output the differentiated switch state signal to the USB controller.

According to another aspect of the present invention, the power controller outputs a standby state signal to indicate a standby state while the printing apparatus is in the standby state, and the printing apparatus further comprises an AND gate to logically multiply the signal outputted from the differential circuit by the standby state signal outputted from the power controller, and to output the logically multiplied signal to a reset port of the USB controller.

According to another aspect of the present invention, the printing apparatus further comprises a buffer to cut off a leakage current, wherein the buffer is interposed between the main controller and at least one of the power controller and the instruction receiving part.

According to another aspect of the present invention, the printing apparatus further comprises an auxiliary power supply to supply power to the instruction receiving part and the power controller.

The foregoing and/or other aspects of the present invention are also achieved by providing a printing apparatus comprising: at least one device unit to perform a printing operation; a main controller to control the device unit; a main power supply to supply power to the main controller; a power switch to be switched on or off by a user's manipulation; a switch state output part to outputting a switch state signal corresponding to a switch-on state or a switch-off state of the power switch; and a power controller to control the main power supply such that the power is supplied to the main controller when the power switch is switched on while the printing apparatus is in a standby state wherein supply of power to the main controller is interrupted, based on the switch state signal from the switch state output part.

According to another aspect of the present invention, the switch state output part comprises a photo coupler to output the switch state signal according to the intensity of light corresponding to the switch-on or off state of the power switch.

According to another aspect of the present invention, the printing apparatus further comprises a buffer to cut off a leakage current, wherein the buffer is interposed between the main controller and at least one of the power controller and the instruction receiving part.

The foregoing and/or other aspects of the present invention are also achieved by providing a control method of a printing apparatus comprising at least one device unit for performing a printing operation, a main controller for controlling the device unit, and an instruction receiving part for receiving a user's printing instruction, comprising: supplying power to the main controller; interrupting supply of power to the main controller when there is no printing instruction from a user for a predetermined period of time; and supplying power to the main controller again when a user's printing instruction is received while the printing apparatus is in a standby state wherein the supply of power to the main controller is interrupted.

According to another aspect of the present invention, the control method further comprises receiving the printing instruction from a host apparatus, via a Universal Serial Bus (USB) controller, according to a USB standard through a communication with the host apparatus.

According to another aspect of the present invention, the control method further comprises outputting a switch state signal corresponding to a switch-on state or a switch-off state of the power switch, and the supplying power to the main controller again comprises supplying power to the main controller again based on the switch state signal when it is determined that the power switch is switched on while the printing apparatus is in the standby state.

According to another aspect of the present invention, the control method further comprises resetting the USB controller according to the switch state signal when the power switch is switched on in the state while the printing apparatus is in the standby state, and the supplying power to the main controller again comprises supplying power to the main controller again when it is determined that the USB controller is reset and the power switch is switched on while the printing apparatus is in the standby state.

Additional aspects and/or advantages of the invention will be set forth in part in the description which follows and, in part, will be obvious from the description, or may be learned by practice of the invention.

BRIEF DESCRIPTION OF THE DRAWINGS

The above and/or other aspects and advantages of the invention will become apparent and more readily appreciated from the following description of the embodiments, taken in conjunction with the accompanying drawings of which.

DETAILED DESCRIPTION OF THE EMBODIMENTS

Figure 1:
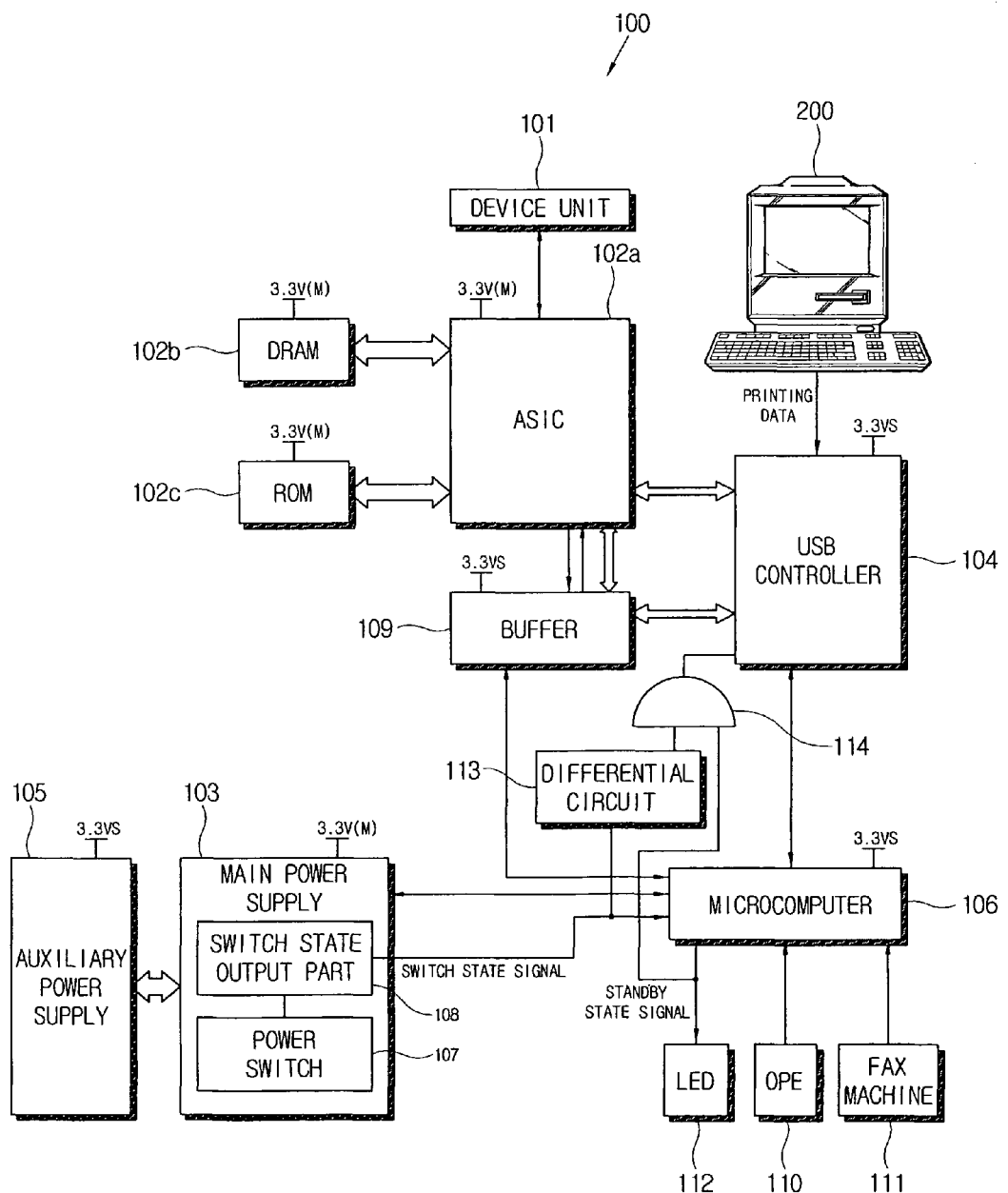
FIG. 1 is a block diagram illustrating a configuration of a printing apparatus according to a first embodiment of the present invention.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

FIG. 1 is a block diagram illustrating a configuration of a printing apparatus 100 according to a first embodiment of the present invention. The printing apparatus 100 performs a printing operation by forming an image on a print medium based on printing data received from a host apparatus 200.

As shown in FIG. 1, the printing apparatus 100 includes a device unit 101 including a motor, an LSU, etc., to perform a printing operation; an ASIC (application specific integrated circuit) 102a including a microprocessor that executes a computer program to control the device unit 101; a DRAM 102b and a ROM 102c, which are memories required to operate the ASIC 102a; a main power supply 103 to supply power (3.3V (M)) to the device unit 101, the ASIC 102a, the DRAM 102b, the ROM 102c, etc.; and a microcomputer 106 to control supply of power of the main power supply. The ASIC 102a and the microcomputer 106 are one example of a main controller and a power supply controller, respectively, according to aspects of the present invention.

In order to reduce power consumption, the printing apparatus 100 is in a standby mode while the printing operation is not performed. In the standby mode, power to the device unit 101 and other elements is interrupted, that is, they do not receive power. The ASIC 102a operates the printing apparatus 100 to enter the standby mode when the printing apparatus is in a normal mode and no printing instruction has been generated after a predetermined period of time has elapsed. The ASIC 102a may have a mode indication port indicating whether the printing apparatus 100 should enter the standby mode and activates the mode indication port in the absence of a printing instruction in the normal mode after the predetermined period of time has elapsed.

The microcomputer 106 monitors the mode indication port of the ASIC 102a and transmits a power off signal to the main power supply 103 when the mode indication port is activated. The main power supply 103 stops its operation when it receives the power off signal from the microcomputer 106. Accordingly, in the standby mode of the printing apparatus 100, in addition to shutting off the main power supply 103, the power to the device unit 101, the ASIC 102a, the DRAM 102b, the ROM 102c, and other components is interrupted, which significantly reduces power consumption.

The printing apparatus 100 also includes an auxiliary power supply 105 to supply power (3.3 VS) to the microcomputer 106 and other components when the main power supply 103 is shut off. The auxiliary power supply 105 generates the power (3.3 VS) even in standby mode. The main power supply 103 and the auxiliary power supply 105 may be respectively implemented by an SMPS (switched mode power supply).

Other aspects of the invention may implement the main power supply 103 and the auxiliary power supply 105 in other ways.

The printing apparatus 100 may also include a USB (universal serial bus) controller 104 that communicates with the host apparatus 200 according to a USB standard and monitors the host apparatus 200 for a user's printing instruction. The USB controller 104 is supplied with the power (3.3 VS) from the auxiliary power supply 105 to perform the monitoring operation even while in the standby mode. The USB controller 104 is one example of an instruction receiving part in the embodiment of the present invention. Other aspects of the present invention may use different instruction receiving parts, such as a Firewire or parallel controller.

When the mode indication port of the ASIC 102a is activated and the printing apparatus 100 enters the standby mode, the microcomputer 106 transmits a reset signal to the USB controller 104 and waits for the user's printing instruction to be received via the USB controller 104.

Upon receiving the reset signal from the microcomputer 106, the USB controller 104 monitors the host apparatus 200 for the user's printing instruction. Upon receiving the user's printing instruction from the host apparatus 200, the USB controller 104 transmits a standby signal to the host apparatus 200 and transmits the received printing instruction to the microcomputer 106.

Upon receiving the user's printing instruction from the USB controller 104 while the printing apparatus 100 is in the standby mode, the microcomputer 106 allows the printing apparatus 100 to exit the standby mode and enter the normal mode. Specifically, upon receiving the user's printing instruction from the USB controller 104, the microcomputer 106 transmits a power-on signal to the main power supply 103 so that the main power supply 103 can supply power to the ASIC 102a and other components. The ASIC 102a is reset to allow the printing apparatus 100 to perform the user's printing operation.

The microcomputer 106 may be implemented by a circuit with power consumption relatively lower than the ASIC 102a and the other components. Accordingly, the power consumption can be reduced while the printing apparatus 100 is in the standby mode by controlling the state of the printing apparatus 100 using not the ASIC 102a with high power consumption, but rather the microcomputer 106 with low power consumption.

In addition, while in standby mode, the USB controller 104, which conducts bi-directional communication with the host apparatus 200, monitors the host apparatus 200 for the presence or absence of the user's printing instruction and enables interfacing between the microcomputer 106 and the host apparatus 200.

Figure 2:
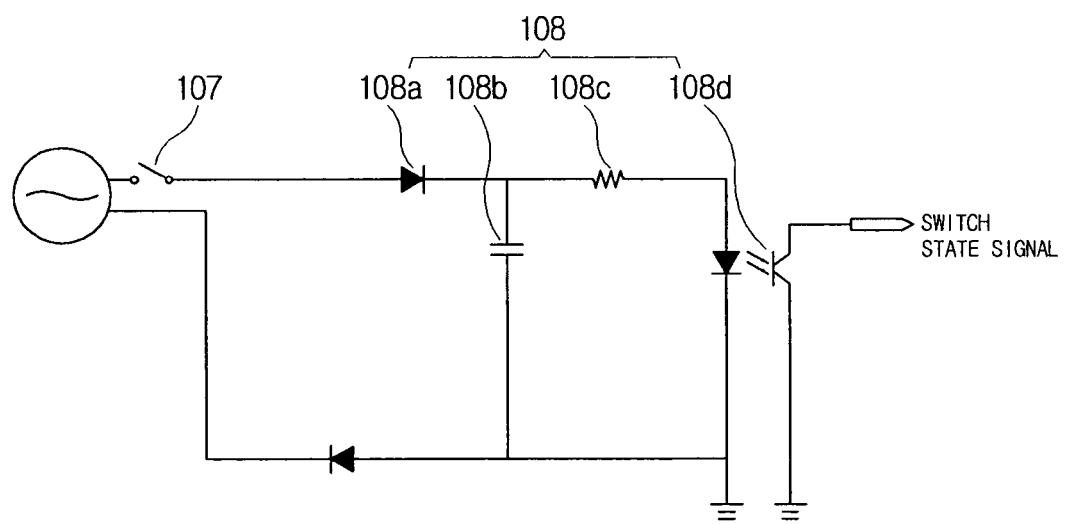
FIG. 2 is a circuit diagram illustrating a configuration of a power switch and a switch state output part according to the first embodiment of the present invention.

The main power supply 103 includes a power switch 107 to be switched on or off by the user and a switch state output part 108 to output a switch state signal indicating the state of the power switch 107. The power switch 107 is in an open state when the power switch 107 is switched off and in a closed state when the power switch 107 is switched on. FIG. 2 is a circuit diagram illustrating a configuration of the power switch 107 and the switch state output part 108 according to the first embodiment of the present invention.

The power switch 107, which is a mechanical switch to be switched on or off, is interposed between an alternating current source and the switch state output part 108 to switch the supply of alternating current to the switch state output part 108. The switch state output part 108 includes diodes 108a, a capacitor 108b, a damping resistor 108c, and a photo coupler 108d, as shown in FIG. 2. The diodes 108a rectify the alternating current. The capacitor 108b smoothes the rectified current. The photo coupler 108d includes a light emitting element, which emits light corresponding to the magnitude of current flowing through the damping resistor 108c and a light receiving element to be switched on when the intensity of the emitted light is more than a predetermined value. An output of a switch state signal depends on the turned on or off state of the light receiving element of the photo coupler 108d.

For example, when a user changes the power switch 107 from an open state to a closed state, current flows through the damping resistor 108c, the light receiving element of the photo coupler 108d is turned on, and the switch state signal goes into a 'low level' state.

The microcomputer 106 monitors the switch state signal output from the photo coupler 108d and determines whether the power switch 107 has changed from the open state (turn-off state) to the close state (turn-on state) or vice versa. If the microcomputer 106 determines that the power switch 107 has changed from the open state to the close state while the printing apparatus 100 is in the standby mode, the microcomputer 106 transmits the power-on signal so that the main power supply 103 can supply power to the ASIC 102a and the other components. The microcomputer 106 may store information on the current state of the power switch 107 in order to determine whether the power switch 107 is opened or closed based on the switch state signal.

Hereinafter, how the switch state output part 108 prevents the microcomputer 106 from malfunctioning while the print apparatus 100 is in the standby mode will be described. The main power supply 103 has a capacitor with high capacitance (not shown) required for a stable supply of power. If there is no switch state output part 108, when the user opens the power switch 107 in the standby mode, there may be a situation where the microcomputer 106, which has relatively low power consumption, operates for a period of time due to residual power charged in the capacitor of the main power supply 103.

In this situation, the microcomputer 106 may not distinguish between a state where power is interrupted by the power switch 107 and a state where power is interrupted due to being in standby mode. As a result, even when the user closes the power switch 107 again, since the microcomputer 106 continues to operate as if the printing apparatus 100 is in the standby mode, the printing apparatus 100 cannot return to the normal printing operation.

According to this embodiment, since the switch state output part 108 reliably outputs a mechanical state of the power switch 107 as an electrical switch state signal, the microcomputer 106 is less likely to malfunction while in the standby mode, which increases the reliability, and decreases the power consumption, of the printing apparatus 100.

The printing apparatus 100 may also include a buffer 109 interposed between the ASIC 102a and either or both of the microcomputer 106 and/or the USB controller 104. The buffer 109 cuts off a leakage current flowing from the microcomputer 106 and the USB controller 104 into the ASIC 102a while the print apparatus 100 is in the standby mode. This further reduces the power consumption of the printing apparatus 100. The printing apparatus 100 may further include an OPE (operating panel) 110 through which a user's instructions corresponding to operation re-start in the standby mode are inputted, a fax machine 111 for receiving a fax while in the standby mode, a scanner (not shown), or any other component. In this case, when at least one of the OPE 110, fax machine 111, or other component requests the printing apparatus 100 to restart its operation while the printing apparatus 100 is in the standby mode, the microcomputer 106 transmits the power-on signal to the main power supply 103 so that the printing apparatus 100 can return to the normal mode. In addition, the printing apparatus 100 may further include an LED 112 indicating whether the printing apparatus 100 is in the normal mode or in the standby mode. In the standby mode, the microcomputer 106 transmits a standby state signal to the LED 112 corresponding to the standby mode of the printing apparatus 100.

In a second embodiment of the present invention, the microcomputer 106 can more efficiently improve operation reliability by controlling the main power supply 103 with other information in addition to a switch state signal. In particular, the USB controller 104 may be reset when the power switch 107 is turned on while the printing apparatus 100 is in a standby mode based on the switch state signal outputted from the switch state output part 108. When the power switch 107 is turned on while the print apparatus 100 is in a standby mode, and it is determined that the USB controller 104 is reset, the microcomputer 106 controls the main power supply 103 to supply power to the ASIC 102a and on the other components. The microcomputer 106 may confirm whether the USB controller 104 is reset by using an interrupt signal. Accordingly, the microcomputer 106 can be prevented from a malfunction generated when the power switch 107 is repeatedly turned on or off, which improves the reliability of the printing apparatus 100.

Figure 4:
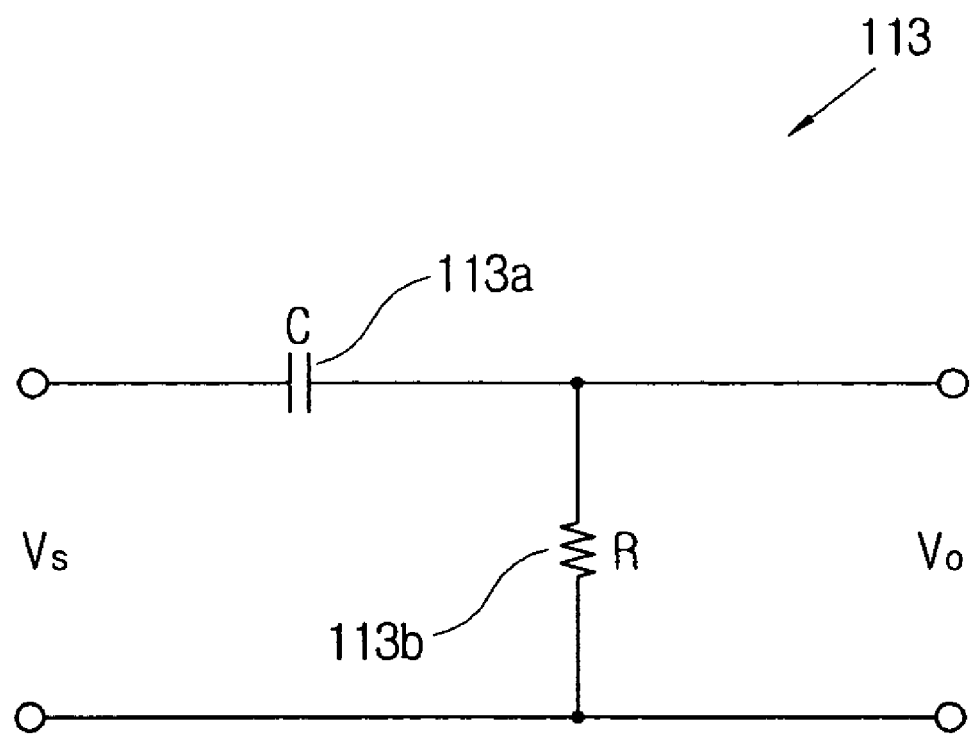
FIG. 4 is a circuit diagram illustrating a configuration of a differential circuit according to the first embodiment of the present invention.

The printing apparatus 100 may also include a differential circuit 113 to differentiate the switch state signal outputted from the switch state output part 108, and to output the differentiated switch state signal to a reset signal input port (not shown) of the USB controller 104. FIG. 4 is a circuit diagram illustrating a configuration of the differential circuit 113. The differential circuit 113 includes a RC circuit having a capacitor 113a and a resistor 113b. An output signal $V_O$ of the differential circuit 113 has a shape of differentiating a wave of an input signal $V_S$. Here, the input signal $V_S$ includes a switch state signal having a step waveform outputted from the switch state output part 108. In other word, when the switch state signal is converted from a 'low' state to a 'high' state, the differential circuit 113 outputs an output signal $V_O$ having an impulse type in an activating mode for a transient response time of R*C. If an output signal $V_O$ having the impulse type is inputted into the reset signal input port (not shown), the USB controller 104 determines that a reset signal is inputted thereto, and performs a reset operation. Thus the differential circuit 113 can prevent USB controller 104 from continually resetting.

In addition, the printing apparatus 100 may include an AND gate 114 to logically multiply the output signal $V_O$ outputted from the differential circuit 113 by a standby state signal outputted from the microcomputer 106, and to output the logically multiplied signal to the USB controller 104. Accordingly, since the USB controller 104 is reset only in the standby mode, the USB controller 104 can be prevented from malfunctioning.

Alternatively, the printing apparatus 100 may not include the USB controller 104.

Figure 3:
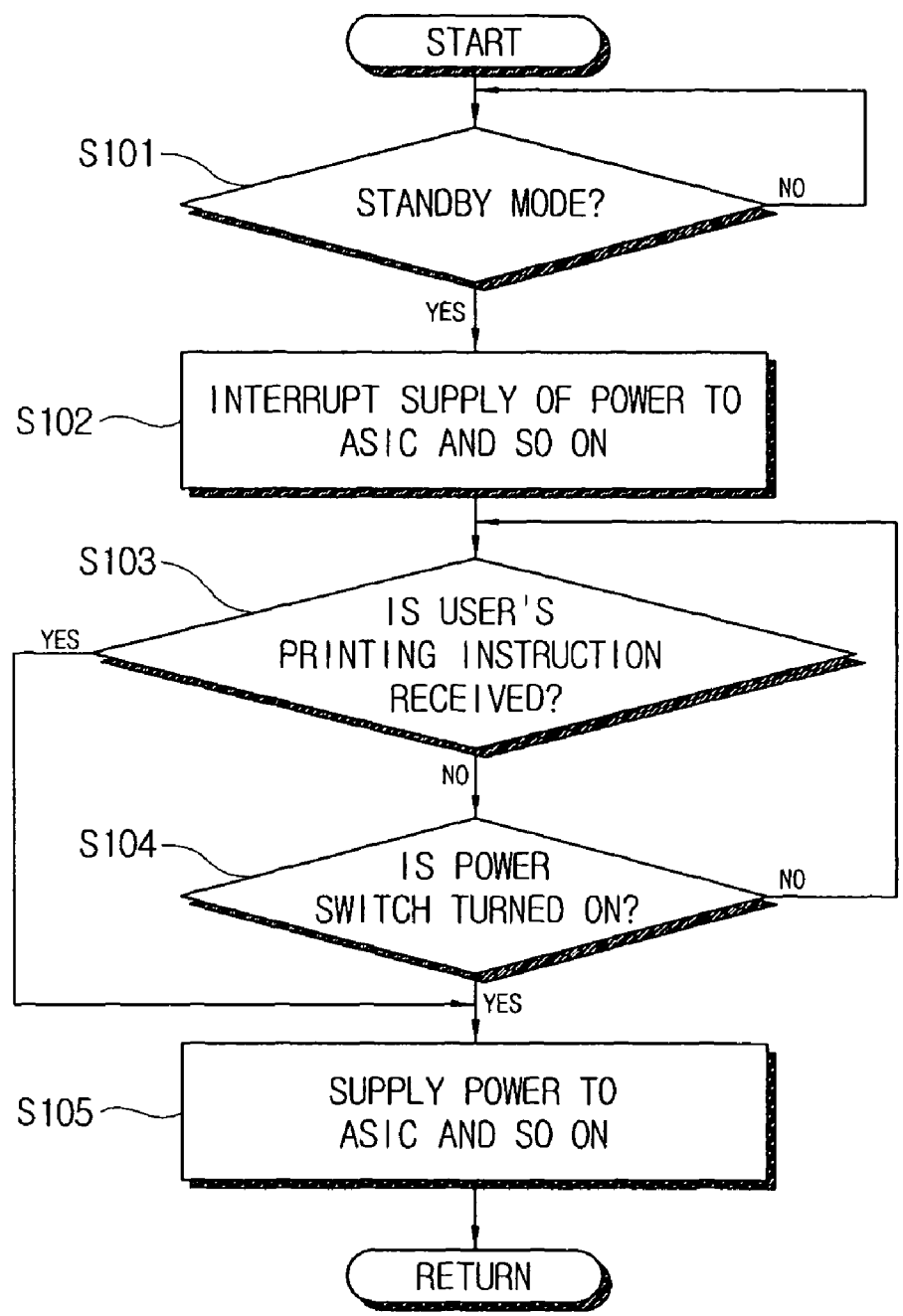
FIG. 3 is a flow chart illustrating a control method of the printing apparatus according to the first embodiment of the present invention.

FIG. 3 is a flow chart illustrating a control method of the printing apparatus 100 according to the first embodiment of the present invention. First, the microcomputer 106 monitors a mode indication port of the ASIC 102a and determines whether or not the printing apparatus 100 has entered the standby mode at operation S101. If it is determined that the printing apparatus 100 has entered the standby mode, the microcomputer 106 transmits a power-off signal to the main power supply 103 so that the supply of power to the device unit 101, the ASIC 102a and other components can be interrupted at operation S102. In addition, the microcomputer 106 monitors the host apparatus 200, via the USB controller 104, for a user's printing instruction at operation S103.

Next, if no printing instruction has been received through the USB controller 104, the microcomputer 106 determines whether the user has changed the power switch 107 from a turn-off state to a switch-on state at operation S104. If it is determined that the power switch 107 has not changed from the turn-off state to the turn-on state, the process returns to operation S103. As an alternative embodiment, operation S103 and operation S104 may be performed in reverse order.

On the other hand, if the microcomputer 106 receives the user's printing instruction from the host apparatus 200 through the USB controller 104, or if the microcomputer 106 determines that the power switch 107 has changed from the turn-off state to the turn-on state, the microcomputer 106 transmits the power-on signal to the main power supply 103 in order to resume supply of power to the ASIC 102a and the other components at operation S105.

Figure 5:
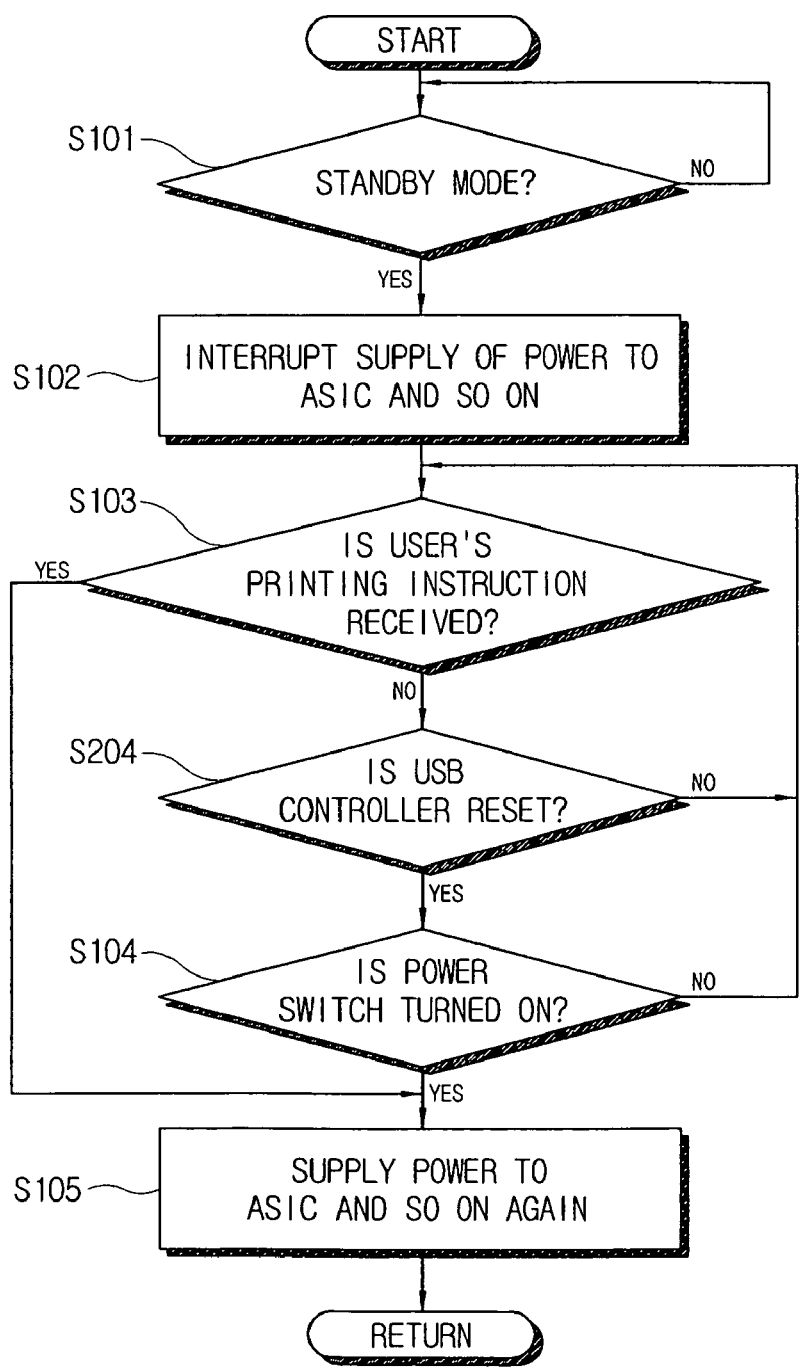
FIG. 5 a flow chart illustrating a control method of a printing apparatus according to a second embodiment of the present invention.

In the second embodiment of the prevent invention, referring to FIG. 5, if it is determined that a user's printing instruction has not been received from the host apparatus 200 through the USB controller 104 at operation S103, the microcomputer 106 determines whether the USB controller 104 has reset at operation S204. If it is determined that the USB controller 104 has not reset, the process returns to operation S103. Conversely, if it is determined that the USB controller 104 has reset, the process returns to operation S104.

Alternatively, operation S103 may be omitted in FIGS. 3 and 5.

As apparent from the above description, aspects of the present invention provide a printing apparatus whose power consumption can be reduced while the printing apparatus in a standby mode by controlling the state of the printing apparatus using a microcomputer with relatively low power consumption, not a circuit with relatively high power consumption, such as an ASIC.

In addition, aspects of the present invention provide a printing apparatus including a USB controller which conducts bi-directional communication with a host apparatus, monitors the presence or absence of a user's printing instruction from the host apparatus in the standby mode, and enables interfacing between the microcomputer and the host apparatus.

In addition, in the printing apparatus according to aspects of the present invention, since a switch state output part with high operation reliability outputs a mechanical state of a power switch as an electrical switch state signal, the microcomputer can be prevented from malfunctioning while the print apparatus is in the standby mode, which improves the reliability, and reduces the power consumption, of the printing apparatus.

In addition, in the printing apparatus according to aspects of the present invention, since a circuit such as a buffer interrupts a leakage current flowing from the microcomputer and the USB controller into the ASIC in the standby mode, the power consumption of the printing apparatus can be further reduced.

Furthermore, in the printing apparatus according to aspects of the present invention, when the power switch is turned on while the printing apparatus is in the standby mode, and it is determined that the USB controller is reset, the microcomputer can be prevented from a malfunction generated when the power switch is repeatedly turned on or off, which improves the reliability of the printing apparatus.

According to other aspects of the present invention, the differential circuit can prevent the USB controller (or other controller) from continually performing a reset operation by differentiating a switch state signal having a step waveform and providing the differentiated switch state signal to the USB controller. Further, the USB controller can be reset only in the standby mode by logically multiplying the differentiated switch state signal by a standby state signal and providing the logically multiplied signal to the USB controller. Accordingly, the USB controller can be prevented from malfunctioning.

Various components of the printing apparatus 100, as shown in FIGS. 1, 2, and 4, such as buffer 109, differential circuit 113, or microcomputer, may be integrated into a single control unit, or alternatively, can be implemented in software or hardware, such as, for example, a field programmable gate array (FPGA). As such, it is intended that the processes described herein to be broadly interpreted as being equivalently performed by software, hardware, or a combination thereof. Software modules can be written via a variety of software languages, such as an assembly language, C, C++, or Java.

Although a few embodiments of the present invention have been shown and described, it will be appreciated by those skilled in the art that changes may be made in these embodiments without departing from the principles and spirit of the invention, the scope of which is defined in the claims and their equivalents.

What is claimed is:

1. A printing apparatus comprising:
at least one device unit to perform a printing operation;
a main controller to control the device unit;
a main power supply to supply power to the main controller;
an instruction receiving part to receive a user's printing instruction and to transmit the user's printing instruction to the main controller, the instruction receiving part being a USB (universal serial bus) controller to receive the user's printing instruction from a host apparatus according to a USB standard through a communication with the host apparatus;
a power controller with a power consumption lower than the main controller to control the main power supply such that power is supplied to the main controller when the instruction receiving part receives the printing instruction while the printing apparatus is in a standby state wherein supply of power to the main controller is interrupted;
an auxiliary power supply to supply power to the instruction receiving part and the power controller;
a power switch to be switched on or off by a user manipulation;
a switch state output part to output a switch state signal corresponding to a switch-on state or a switch-off state of the power switch; and
wherein the power controller controls the main power supply such that the power is supplied to the main controller when it is determined, based on the switch state signal from the switch state output part, that the power switch is switched on while the printing apparatus is in the standby state.

2. The printing apparatus according to claim 1, wherein the switch state output part comprises a photo coupler to output the switch state signal according to an intensity of light corresponding to the switch-on or switch-off state of the power switch.

3. The printing apparatus according to claim 1, wherein:
the USB controller is reset according to the switch state signal outputted from the switch state output part when the power switch is switched on while the printing apparatus is in the standby state; and
the power controller controls the main power supply such that the power is supplied to the main controller when it is determined that the USB controller is reset and the power switch is switched on while the printing apparatus is in the standby state.

4. The printing apparatus according to claim 3, further comprising a differential circuit to differentiate the switch state signal outputted from the switch state output part, and to output the differentiated switch state signal to the USB controller.

5. The printing apparatus according to claim 4, wherein:
the main controller outputs a standby state signal to indicate a standby state while the printing apparatus is in the standby state, and
the printing apparatus further comprises an AND gate to logically multiply the signal outputted from the differential circuit by the standby state signal outputted from the main controller, and to output the logically multiplied signal to a reset port of the USB controller.

6. The printing apparatus according to claim 1, further comprising a buffer to cut off a leakage current, wherein the buffer is interposed between the main controller and at least one of the power controller and the instruction receiving part.

7. A printing apparatus comprising:
at least one device unit to perform a printing operation;
a main controller to control the device unit;
a main power supply to supply power to the main controller;
a power switch to be switched on or off by a user manipulation;
a switch state output part to output a switch state signal corresponding to a switch-on state or a switch-off state of the power switch;
a power controller to control the main power supply such that the power is supplied to the main controller when the power switch is switched on while the printing apparatus is in a standby state wherein supply of power to the main controller is interrupted, based on the switch state signal from the switch state output part; and
an auxiliary power supply to supply power to the instruction receiving part and the power controller.

8. The printing apparatus according to claim 7, wherein the switch state output part comprises a photo coupler to output the switch state signal according to an intensity of light corresponding to the switch-on or switch-off state of the power switch.

9. The printing apparatus according to claim 7, further comprising a buffer to cut off a leakage current, wherein the buffer is interposed between the main controller and at least one of the power controller and the instruction receiving part.

* * * * *